United States Patent
Youngner (10) Patent No.: US 8,076,737 B2
(45) Date of Patent: Dec. 13, 2011

(54) SYSTEMS AND METHODS FOR ACOUSTIC SENSING

(75) Inventor: Daniel W. Youngner, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 876 days.

(21) Appl. No.: 12/123,628

(22) Filed: May 20, 2008

(65) Prior Publication Data

US 2009/0289198 A1 Nov. 26, 2009

(51) Int. Cl.
*H01L 29/84* (2006.01)
(52) U.S. Cl. .......................... 257/416; 257/245; 257/254
(58) Field of Classification Search .................. 257/245, 257/254, 416
See application file for complete search history.

(56) References Cited

U.S. PATENT DOCUMENTS

| | | | |
|---|---|---|---|
| 5,275,055 A | 1/1994 | Zook et al. | |
| 5,417,115 A | 5/1995 | Burns | |
| 5,559,358 A | 9/1996 | Burns et al. | |
| 6,246,638 B1 | 6/2001 | Zook et al. | |
| 6,710,355 B2 * | 3/2004 | Youngner | 250/458.1 |
| 6,714,007 B2 | 3/2004 | Youngner | |
| 2003/0137296 A1 | 7/2003 | Youngner | |
| 2003/0146393 A1 | 8/2003 | Youngner | |

OTHER PUBLICATIONS

Daniel Youngner, Systems and Methods for Remote Optical Sensing, U.S. Appl. No. 12/108,446, U.S.

* cited by examiner

*Primary Examiner* — N Drew Richards
*Assistant Examiner* — Jae Lee
(74) *Attorney, Agent, or Firm* — Fogg & Powers LLC (57) ABSTRACT

An optical-based acoustic sensor system detects sound. An exemplary embodiment has a substrate with a surface and an internal region; a shell disposed above the substrate surface, the shell operable to receive incident light emitted by a light source; a beam disposed blow the shell; a photodiode on the substrate surface below the beam, and in response to receiving a first portion of light, the photodiode is operable to generate a charge that attracts the beam such that a motion is induced in the beam to cause the beam to resonate; and a microphone device coupled to the shell, the microphone device operable to detect acoustic waves, and operable to modulate the vibratory motion of the beam, wherein a second portion of light is modulated by the vibratory motion of the beam to generate sound-modulated light that is emitted from the sensor.

18 Claims, 6 Drawing Sheets

SYSTEMS AND METHODS FOR ACOUSTIC SENSING

BACKGROUND OF THE INVENTION

An optically powered resonant integrated microstructure (O-RIMS) sensor is operable to sense characteristics of an object of interest based upon detection of modulated light reflected from the O-RIMS optical-based sensor. An exemplary O-RIMS sensor is disclosed in U.S. Pat. No. 6,710,355, entitled "OPTICALLY POWERED RESONANT INTEGRATED MICROSTRUCTURE PRESSURE SENSOR" to Daniel W. Youngner, filed on Feb. 7, 2002, which is incorporated by reference herein in its entirety. This O-RIMS optical-based sensor may be suitable for detecting characteristics of an object of interest under a variety of conditions. However, these O-RIMS optical-based sensor devices are not acoustic sensors. Accordingly, there is a need to detect sounds with an O-RIMS optical-based sensor device.

SUMMARY OF THE INVENTION

Systems and methods of detecting sounds are disclosed. An exemplary embodiment has a substrate with a surface and an internal region; a shell disposed above the substrate surface, the shell operable to receive incident light emitted by a light source; a beam disposed below the shell; a photodiode on the substrate surface below the beam, and in response to receiving a first portion of light, the photodiode is operable to generate a charge that attracts the beam such that a motion is induced in the beam to cause the beam to resonate; and microphone device coupled to the shell, the microphone device operable to detect acoustic waves, and operable to modulate the vibratory motion of the beam, wherein a second portion of light is modulated by the vibratory motion of the beam to generate sound-modulated light that is emitted from the optical acoustic sensor.

In accordance with further aspects, an exemplary embodiment receives incident light on an outer surface of a shell of the O-RIMS sensor; transmits the received incident light through the shell, through a beam, and onto a photodiode; in response to transmitting the incident light onto the photodiode, generates a charge in the photodiode that attracts the beam such that a motion is induced in the beam to resonate; changes tension of the beam in response to detecting acoustic waves; modulates a resonate frequency of the beam by the vibratory motion; and generates acoustically modulated light from the modulated resonate frequency of the beam.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
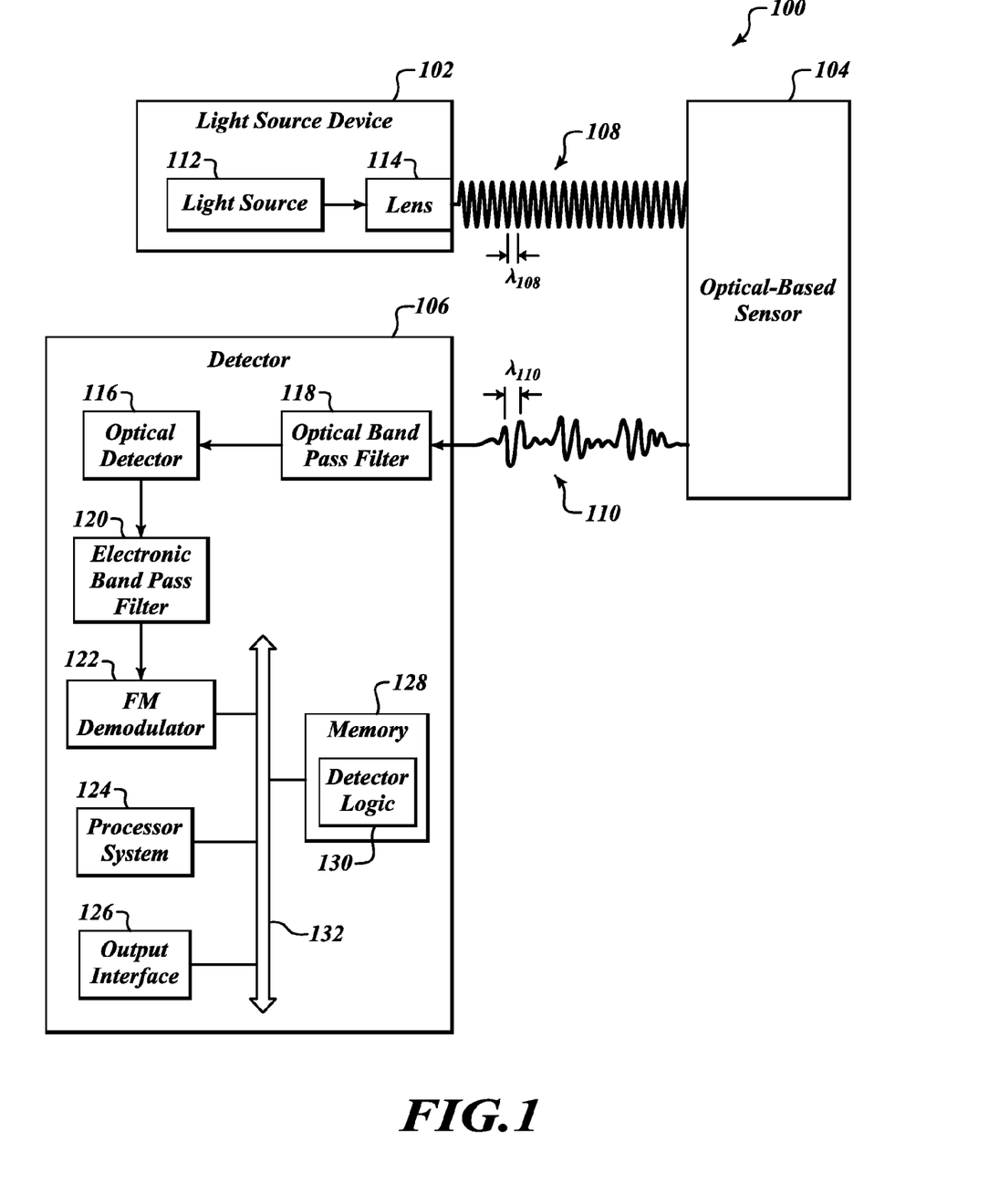
FIG. 1 is a block diagram of an embodiment of an optical-based acoustic sensor system.

FIG. 1 is a block diagram of an embodiment of an optical-based acoustic sensor system 100. The optical-based acoustic sensor system 100 comprises a light source device 102, an optical-based acoustic sensor 104, and an detector 106.

The light source device 102 emits light 108 (which may be characterized by a wavelength $\lambda_{108}$) towards the optical-based acoustic sensor 104. In response to receiving the light 108, the optical-based acoustic sensor 104 emits the sound-modulated light 110 (which may be characterized by a wavelength $\lambda_{110}$). The sound-modulated light 110 is modulated by sounds detected by the optical-based acoustic sensor 104. The detector 106 is operable to detect the received sound-modulated light 110 emitted from the optical-based acoustic sensor 104.

The light source device 102 comprises a light source 112 and an optional lens 114. The light source 112 may be any suitable source of light that emits light that is receivable by the optical-based acoustic sensor system 100.

The light 108 is emitted as a beam that is directed towards and onto the optical-based acoustic sensor 104. The light may travel through free space, such as when directed by a user from a remote location, or may travel through a directed medium, such as a fiber optical cable or other suitable medium. In one embodiment, the light source 112 is a laser. For example, a laser emits a beam of light at a particular wavelength (or range of wavelengths) such as, but not limited to, a wavelength ($\lambda_{108}$) corresponding to blue light. In other embodiments, the light source 112 may emit light at any of a broad range of wavelengths. In some embodiments, the light source 112 emits collimated light that may be more efficiently directed towards the optical-based acoustic sensor 104.

The optional lens 114 may be used to adjust characteristics of the light 108 emitted by the light source 112. In one embodiment, the lens 114 may be a filter that is transmissive of a particular wavelength, or wavelength range. For example, but not limited to, the lens 114 may pass a wavelength of light corresponding to near-infrared or infrared (IR) light. Alternatively, or additionally, the lens 114 may be operable to focus, collimate, or otherwise condition the light emitted by the light source 112.

The detector 106 comprises an optical detector 116, an optional optical band pass filter 118, an optional electronic band pass filter 120, an optional frequency modulation (FM) demodulator 122, an optional processor system 124, an optional output interface 126, and an optional memory 128. The detector logic 130 resides in the memory 128. In an exemplary embodiment of the detector 106, the selected ones of the above components may be communicatively coupled to each other via a communication bus 132. Some embodiments may include one of, or both of, the optical band pass filter 118 and the electronic band pass filter 120.

The optical detector 116 is operable to receive the sound-modulated light 110 emitted by the optical-based acoustic sensor 104. In a preferred embodiment, the optical band pass filter 118 receives and processes the sound-modulated light 110. In an exemplary embodiment, the optical band pass filter 118 is configured as a relatively narrow band pass filter having a band pass frequency corresponding to the wavelength of the sound-modulated light 110.

The optical detector 116 generates a signal with information corresponding to the detected sound-modulated light 110. In some embodiments, an optional electronic band pass filter 120 may be included that further filters the electronic signal output from the optical detector 116. Further, some embodiments may have the optical detector 116 configured to output a digital signal.

The optical detector 116 generates a signal with information corresponding to the detected sound-modulated light 110. In some embodiments, an optional electronic band pass filter 120 may be included that further filters the electronic signal output from the optical detector 116. The FM demodulator 122 demodulates the electronic signal to retrieve the information from the carrier portion of the light 110. Further, some embodiments may have the optical detector 116 configured to output a digital signal.

An optional processor system 124 processes the information in the signal to generate a signal corresponding to the sounds detected by the optical-based acoustic sensor 104. For example, the optical-based acoustic sensor system 100 may be configured to detect sounds of interest, and the processor system 124 may be configured to filter out undesirable sound, such as background noise or the like. Alternatively, or additionally, the processor system 124 may be configured to amplify particular sounds of interest, such as voices of one or more speakers.

The acoustic information extracted from the detected sound-modulated light 110 is output to a user in a meaningful manner from the output interface 126. Output interface 126 is in communication with a speaker such that the detected sounds are audibly reproduced. Alternatively, or additionally, the output interface 126 may provide information to a display, another processing system, and/or another memory.

The detector 106 may include a memory 128 with detector logic 130 residing therein. Thus, the processor system 124 may retrieve the logic 130 so that the signal generated by the optical detector 116 can be processed to determine the acoustical information of interest residing in the signal output by the optical detector 116. In some embodiments, the memory 128 may be further operable to store the acoustic information extracted from the detected sound-modulated light 110.

The above-described components of the detector 106 may be communicatively coupled to each other via the communication bus 132, thereby providing connectivity between the above-described components. In alternative embodiments, the above-described components may be connectively coupled to each other in a different manner than illustrated in FIG. 1. For example, one or more of the above-described components may be directly coupled to the processor system 124 or may be coupled to the processor system 124 via intermediary components (not shown).

Figure 2:
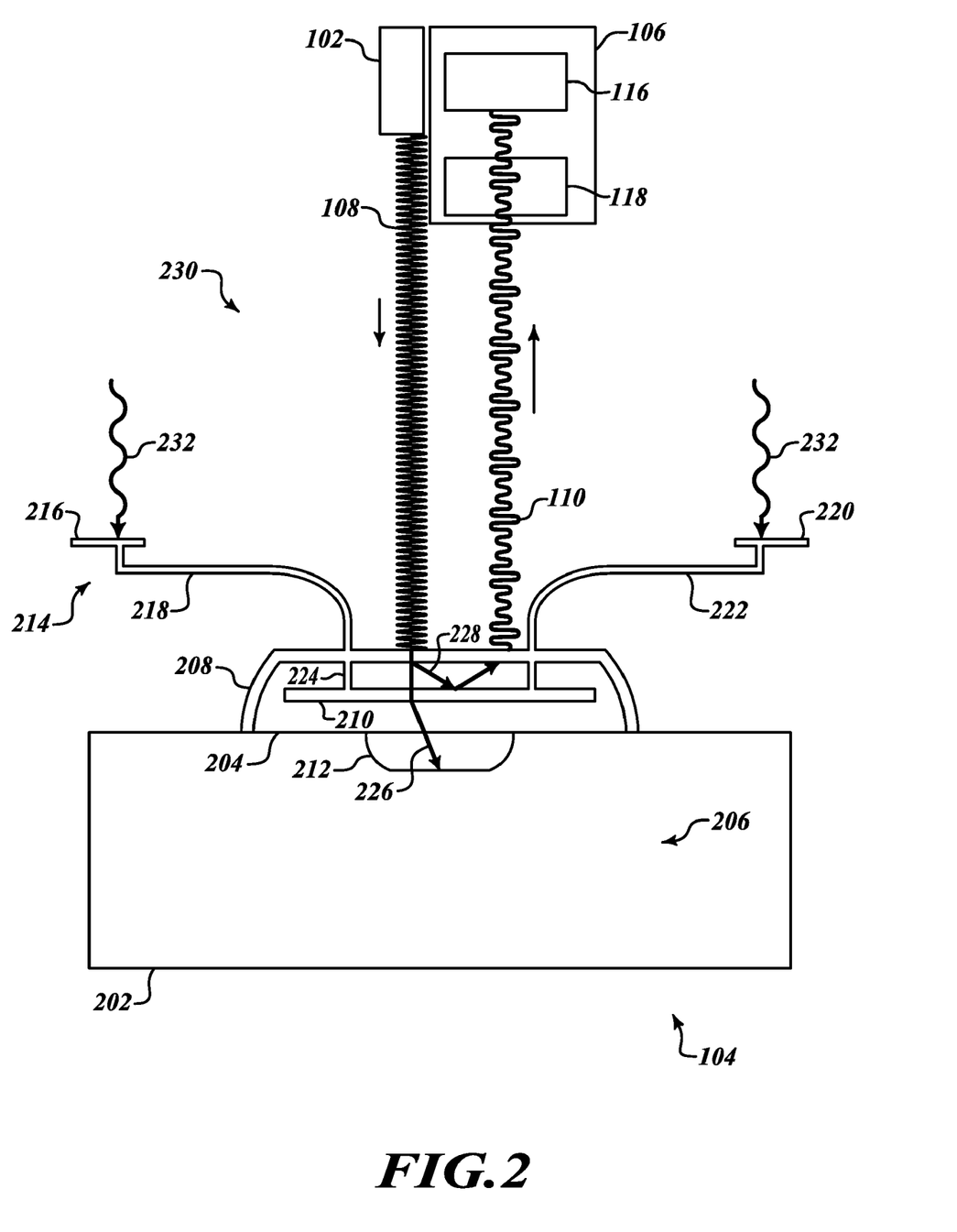
FIG. 2 is a block diagram of an embodiment of an optical-based acoustic sensor receiving light emitted from a light source device and transmitting light to an optical detector.

FIG. 2 is a block diagram of an embodiment of an optical-based acoustic sensor 104 receiving light 108 emitted from the light source device 102 and transmitting the sound-modulated light 110 to the detector 106. The optical-based acoustic sensor 104 comprises a substrate 202 with a surface 204 and an internal region 206, a shell 208 disposed above the substrate surface 204, a beam 210 disposed below the shell 208, a photodiode 212 on the substrate surface 204 below the beam 210, and a microphone 214. The microphone 214 includes a microphone diaphragm 216 coupled to the shell 208 via a lever 218. The lever 218 may act as a lever to facilitate transfer of deflections generated by the diaphragm 216 to the beam 210. In a preferred embodiment, the microphone 214 includes a second microphone diaphragm 220 coupled to the shell 208 via a second lever 222.

The optical-based acoustic sensor 104 has its beam 210, a microbeam having a resonant frequency, held by supports 224. The resonant frequency of the beam 210 is a function of its design characteristics, and is variable in response to tension in the beam 210. The beam 210 may be vacuum encapsulated by the shell 208, which may be a polysilicon material. The shell 208 and the beam 210 together form a micromachined integrated device. The beam 210, the substrate 202, and the top surface of the shell 208 form a Fabry-Perot cavity.

In an exemplary embodiment, a first portion 226 of the light 108 incident on the shell 208 is transmitted through the shell 208, through the beam 210, and onto the photodiode 212. The portion 226 of the light 108 incident on the photodiode 212 generates a charge in the photodiode 212. The generated charge creates an electro-static attraction between the beam 210 and the photodiode 212 which causes the beam 210 to flex towards the photodiode 212. As the beam 210 approaches its maximum flexure, the potential energy within the beam 210 builds to a point where the restoring force within the beam 210 overcomes the electro-static attraction of the beam 210 to the photodiode 212. The beam 210 then springs forward toward a neutral or resting position, where the electro-static attraction between the beam 210 and the photodiode 212 builds again. Accordingly, the beam 210 moves up and down in resonance, where the frequency of the up and down motion is a function of the characteristics of the beam 210, such as, but not limited to, beam tension.

Alternatively, or additionally, the beam 210 may be designed such that the brightness of the portion 226 of the light 108 incident on the photodiode 212 is brighter when the beam 210 is closer to the photodiode 212, and is less brighter when the beam 210 is farther away from the photodiode 212. Accordingly, as the beam 210 moves up and down, the brightness of the portion 226 of the light 108 incident on the photodiode 212 decreases and then increases, further modulating the charge accumulation on the photodiode 212.

Alternatively, or additionally, the intensity of the light 108 emitted from the light source 112 may be variable to control the resonate motion of the beam 210. For example, but not limited to, the light source 108 may be operated to "blink" on and off at a frequency corresponding to the resonate frequency of the beam 210. In such embodiments, the optical detector 116 in detector 106, or another photodetector (not shown), detects the modulated light 110. The detected modulated light 110 is used to generate an input to a feedback circuit (not shown) which controls the blinking of the light source 112. Accordingly, the blinking of the light source 112 is in phase with the resonation of the beam 210. In other embodiments, the intensity of the emitted light 108 is varied from a low intensity to a higher intensity by controlling output of the light source 112.

A second portion 228 of the light 108 is incident on and reflected from the beam 210. Upon reflection from the beam 210, the second portion 228 of light is further modulated by the resonating movement of the beam 210. Thus, the frequency of the second portion 228 of light, which is reflected from the beam 210 and out through the shell 208, is modulated by the frequency of the resonating beam 210, thus generating the modulated light 110. The modulated light 110 exits the shell 208 and enters the free space 230, creating an optical signal whose intensity is modulated (changes) as the beam 210 vibrates.

The tension in the beam 210 is modified by the sounds sensed by microphone 214. Thus, the resonant vibratory frequency of the beam 210 changes as the tension in the beam 210 is changed by the sensed sounds. Accordingly, the resonate frequency of the beam 210 changes as a function of the sensed acoustic waves 232.

An exemplary microphone 214 is operable to sense acoustic waves 232 (sounds) travelling nearby through the free space 230 that are incident on the microphone 214. The microphone 214 transmits a signal via levers 218, 222 to the shell 208. In one embodiment, the levers 218, 222 are structures that communicate vibrations generated by the diaphragms 216, 220, respectively, to the shell 208. The vibrations are transmitted from the shell 208, through the supports 224, and into the beam 210 to modify the tension of the beam 210. Accordingly, these vibrations further modify the resonant frequency of the beam 210 such that the second portion 228 of the light 108, as it is reflected from the surface of the beam 210, is further modulated by the movements of the beam 210. Thus, the vibrations induced by the acoustic waves 232 detected by the microphone 214 result in the sound-modulated light 110.

Accordingly, when the sound-modulated light 110 is received by the detector 106, the sound-modulated light 110 may be evaluated to determine the vibratory frequency of the beam 210. As the vibratory frequency of the beam 210 changes as a function of the acoustic waves 232 detected by the microphone 214, the modulation of the sound-modulated light 110 changes. The frequency of sound-modulated light 110 is detectable by the detector 106.

Figure 3:
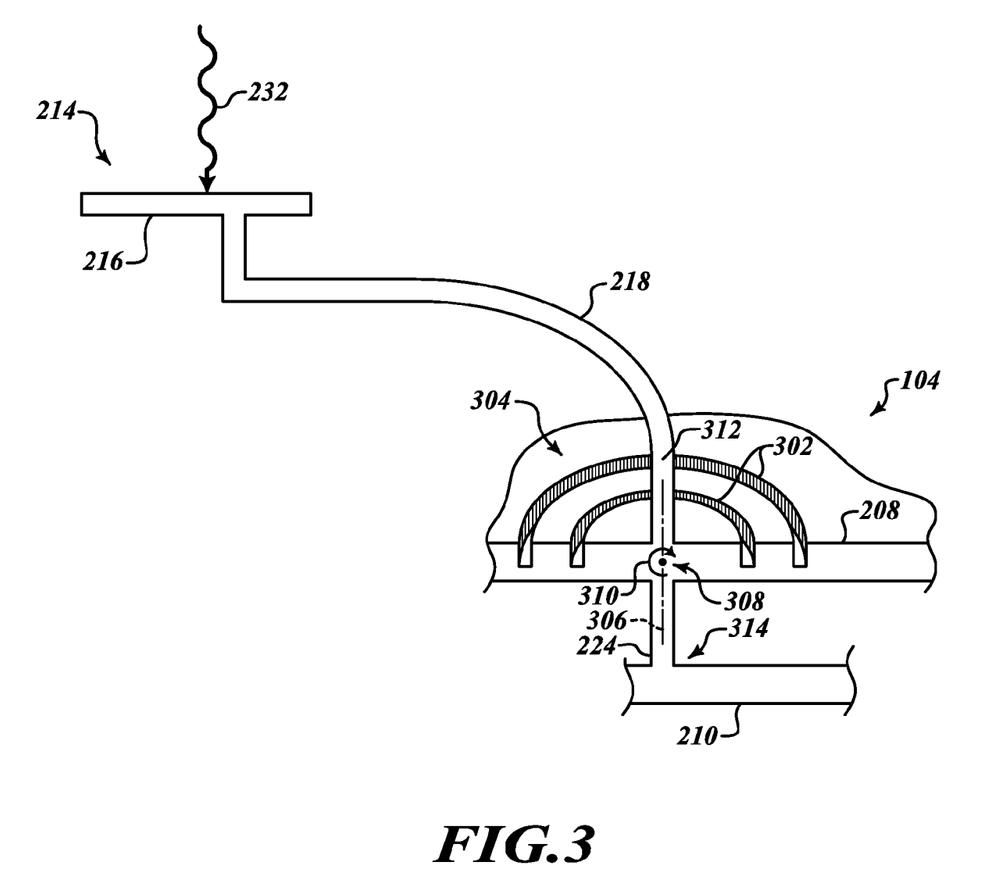
FIG. 3 is a perspective cut-away view showing channels in a top portion of the shell.

FIG. 3 is a perspective cut-away view of a portion of an embodiment of the optical-based acoustic sensor 104 showing a plurality of channels 302 in a top portion 304 of the shell 208. The channels 302 structurally weaken a portion 304 of the shell 208 in proximity to the location where the lever 218 and the corresponding support 224 are attached to the shell 208.

The weakening of the shell 208 around the weakened portion 304 facilitates transfer of vibrations from the microphone diaphragm 216 to the beam 210 (via the lever 218, the shell 208, and the support 224). As noted above, the lever 218 acts as a lever between the surface of the shell 208 and the diaphragm 216. When diaphragm 216 moves, the lever action of the lever 218 causes a change in the position in the end portion 312 of the lever 218. That is, there will be an induced movement along the axis 306 caused by vibratory motion in the lever 218. Accordingly, the weakened portion 304 of the shell 208 will rotate about a pivot point 308, thereby inducing a corresponding movement of the support 224. Induced motion in the support 224 causes a change in tension of the beam 210. A change in the tension of beam 210 causes a change in the resonant frequency of the beam 210.

For example, when the diaphragm 216 moves downward during a momentary increase in pressure from acoustic wave 232, a rotation of the end portion 312 about the pivot point 308 (denoted by the rotation vector 310) will occur. In turn, this rotation of the end portion 312 will induce a corresponding motion to the right of the support 224. Movement of the support 224 to the right will reduce the tension of the beam 210.

Since the resonate frequency of the beam 210 is a function of the tension in the beam, deflection of diaphragm 216 alters the resonate frequency of the beam 210. Given that the lever 218 moves during vibrations generated by the diaphragm 216 in response to the incident acoustic waves 232, the resonant frequency of the beam 210 corresponds to the acoustic waves 232 (sounds) incident on the diaphragm 216 the microphone 214.

As noted above, the preferred embodiment includes a second lever 222 coupling a second diaphragm 220 to the beam 210, via the shell 208 and its respective support 224. A plurality of channels 302 also provides for weakening of a portion of the shell 208 in proximity to the location where the lever 222 and the corresponding support 224 are attached to the shell 208. When the two levers 218, 222 are actuated together by their corresponding diaphragms 216, 220, the overall change in tension of beam 210 increases, thereby increasing the overall magnitude of the change in the resonant frequency of the beam 210 in response to acoustic wave 232. The two levers 218 and 222 acting together will roughly double the sensitivity of the device.

Depending upon the embodiment, one or more channels 302 may be used to structurally weaken the portion 304 of the shell 208. The number of, and the characteristics of, the channels 302 may be designed depending upon the dimensions and characteristics of the shell 208, levers 218, and/or support 224. For example, some embodiments may have a wider channel 302 and/or a deeper channel 302. Furthermore, channels may be any suitable shape, such as, but not limited to, circles or ellipses. The channels may form a continuous circle, oval, or ellipse. The shapes, sizes and other characteristics of adjacent channels may vary from each other. The weakened portion 304 of the shell may be formed with alternative means, such as a dish-shaped region or by a thinning of the shell 208. The channels or other weakening means may alternatively, or additionally, be located on the underside of the shell 208. In a MEMS type devices, the channels 302 or other weakening means may be formed by any suitable etching, deposition, or micro-machining process.

Figure 4:
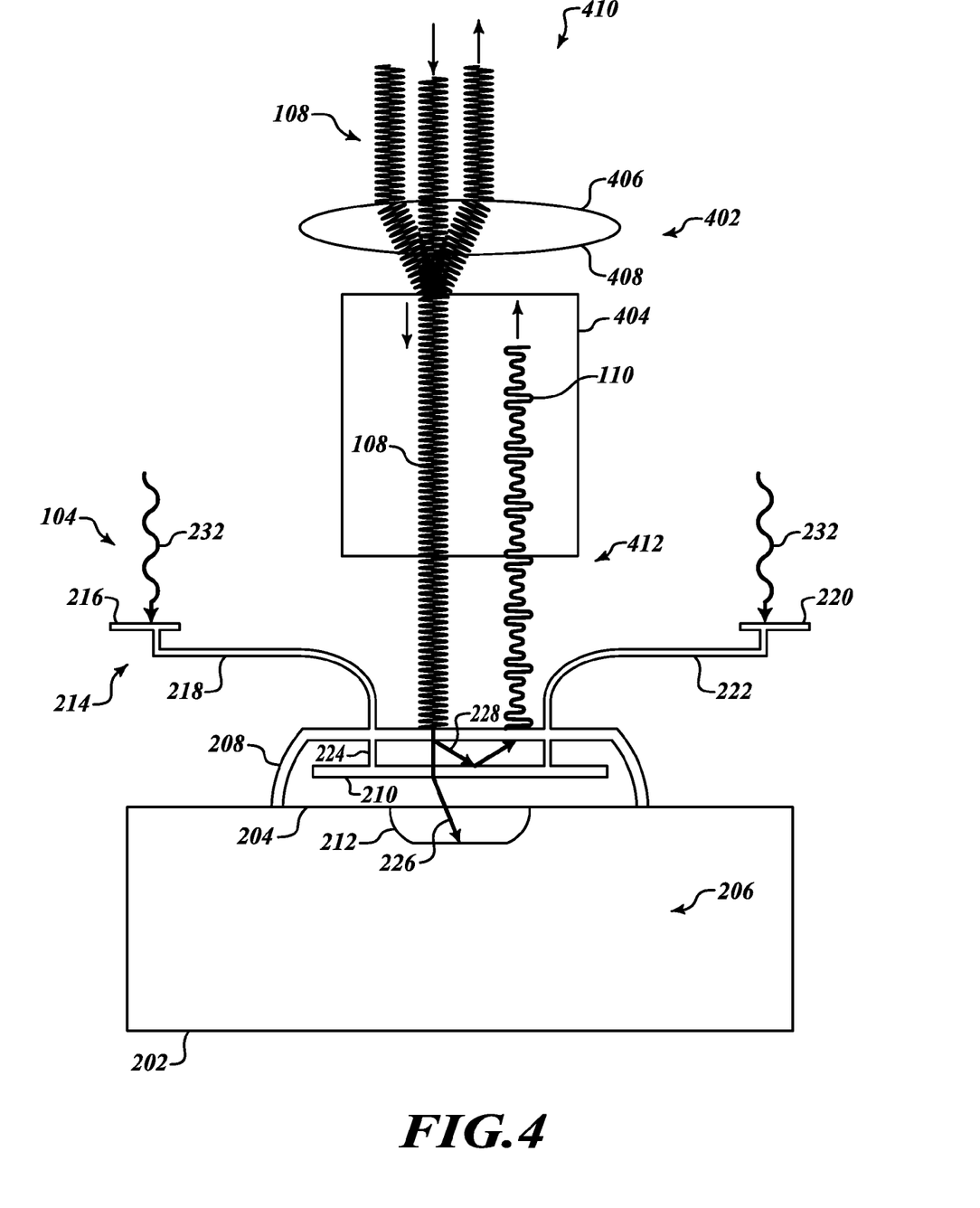
FIG. 4 is a block diagram of an alternative embodiment of an optical-based acoustic sensor.

FIG. 4 is a block diagram of portions of an alternative embodiment of an optical-based sensor system 100. Included are a collimating lens 402 and an optical fiber 404. The collimating lens 402 and the optical fiber 404, which may be used separately or used in cooperation with each other, condition the light 108 emitted by the light source device 102 and the second portion 228 of light (after modulation by the beam 210).

The collimating lens 402 may be used to gather the light 108 emitted by the light source 112 at its exterior surface 406. In one embodiment, the collimating lens 402 may be a filter that is transmissive of a particular wavelength, or wavelength range. For example, but not limited to, the collimating lens 402 may pass a wavelength of light corresponding to the near infrared. Alternatively, or additionally, the collimating lens 402 may be operable to focus, collimate, or otherwise condition the incident light 108. The light exits from the surface 408.

The optical fiber 404 may be used to communicate the light 108 from a first location 410 where the light 108 is received to a second location 412 proximate to the surface of the shell 208. The optical fiber 404 may be advantageous in applications where the optical-based acoustic sensor 104 is located at a position where light 108 can not be readily directed onto the shell 208 of the optical-based acoustic sensor 104 and/or where the sound-modulated light 110 can not be readily directed towards the detector 106.

For example, the optical-based acoustic sensor 104 may be located on one side of a corner of a structure (e.g.; a wall) that is not in the line of sight of the light source device 102. Accordingly, the collimating lens 402, if used, directs the light 108 into the optical fiber 404. The optical fiber 404 directs the light 108 around the corner and then emits the light 108 such that the light 108 becomes incident on the shell 208. The optical fiber 404 then receives the sound-modulated light 110, directs the sound-modulated light 110 back around the corner, and then emits the sound-modulated light 110 such that the sound-modulated light 110 is detectable by the optical detector 116.

Figure 5:
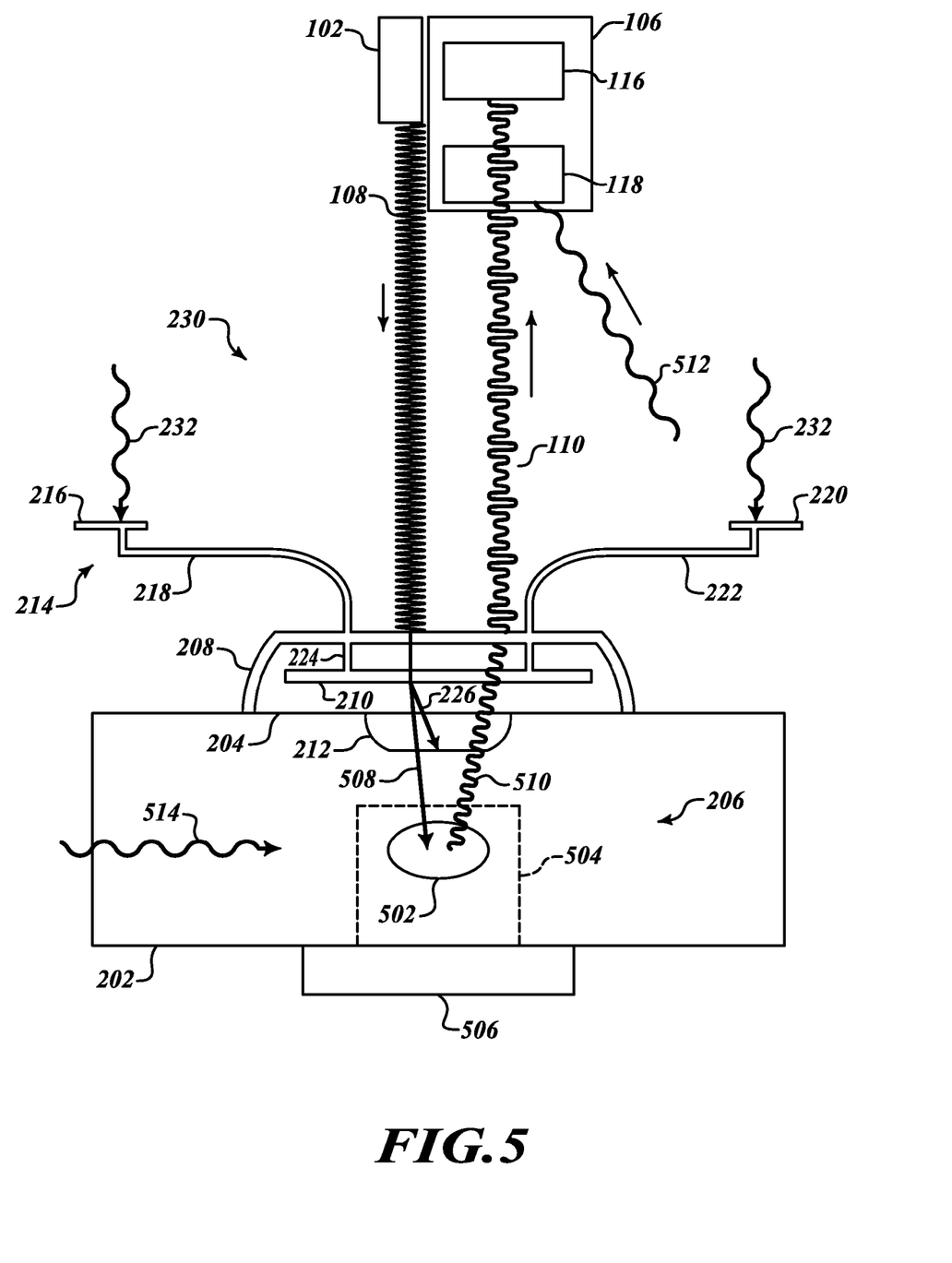
FIG. 5 is a block diagram of an alternative embodiment of an optical-based acoustic sensor.

FIG. 5 is a block diagram of an alternative embodiment of a optical-based acoustic sensor 104. This embodiment may be remotely located from the light source device 102. The optical-based acoustic sensor 104 further comprises a phosphor 502 in the substrate internal region 206. In an exemplary embodiment, the phosphor 502 resides in a cavity 504 formed in the substrate internal region 206. A cover 506 may be used to seal the cavity 504 to retain the phosphor 502.

A portion 508 of the light 108 incident on the shell 208 is transmitted to the phosphor 502 (via the shell 208, the beam 210, and/or the photodiode 212). The phosphor 502 is operable to receive the portion 508 of the incident light 108. In response to the phosphor 502 receiving the portion 508 of the light 108, the phosphor 502 becomes excited and emits an amount of phosphor emitted light 510.

The phosphor emitted light 510 passes through the beam 210 and is modulated by the vibratory movement of the beam 210. Since the resonant frequency of beam 210 changes due to the vibrations caused by the acoustic waves 232 incident on the diaphragms 216, 220, modulation of the phosphor emitted light 510 changes as a function of the changing vibratory movement of the beam 210. When the modulated light 110 is received by the detector 106, the modulated light 110, the changes in the modulation of the modulated light 110 may be evaluated to determine the changes in the vibratory frequency of the beam 210, which corresponds to the acoustic waves 232 detected by the optical-based acoustic sensor 104.

The phosphor emitted light 510 is characterized by at least one wavelength or a wavelength range. The wavelength of the phosphor emitted light 510 is preferably different from the wavelength of the received light 108. Preferably, the phosphor emitted light 510 is a red-shifted wavelength of the incident light 108. In an exemplary embodiment, the phosphor 502 is neodynium trishydroxquinoline. Other embodiments use other types of chemicals for the phosphor 502.

Embodiments of the optical-based sensor system 100 are useful in cases where the optical-based acoustic sensor 104 is remote from the light source device 102 and/or the detector 106. If the optical-based sensor system 100 is used in a covert manner, the wavelengths of the emitted light 108 and/or the phosphor emitted light 510 (which is modulated into the sound-modulated light 110) may in the non-visible spectrum.

Embodiments of the optical-based sensor system 100 may also be useful in cases where a significant amount of background light 512 is present. As long as the intensity of the modulated light 110 is comparable to or greater than the intensity of the background light 512 having the same frequency as the modulated light 110, there is a net gain in the signal-to-noise ratio. For example, the walls of a room lit with an incandescent light bulb might emit approximately $1 \times 10^{-8}$ Watts/cm$^2$ of light in the frequency range of the phosphor emitted light 510. By contrast, the phosphor 502 may be operable to emit $1 \times 10^{-5}$ Watts/cm$^2$ in the same wavelength band. In this example, a factor of 1000 improvement in the signal-to-noise ratio is achieved by using the optical-based sensor system 100.

Embodiments of the optical-based sensor system 100 are also particularly useful when there is significant reflection of the illuminating light 108 back toward the detector 106. As an example, consider the case in which the reflected light is 1000× more intense than the modulated information-carrying light 110. By filtering out the reflected light while allowing modulated light 110 to pass, a factor of 1000× improvement in signal to noise (S/N) ratio would be achieved. In the most general case, there is both reflected illuminating light 108 and background light 512. This invention improves the S/N ratio for both cases.

In an alternative embodiment, the light source device 102 and the detector 106 are separated. In such an embodiment, the light 108 emitted by the light source device 102 need not pass through the shell 208, the beam 210, and/or the photodiode 212, to become incident on the phosphor 502. For example, the light source device 102 may be located to the side of the substrate 202 such that a portion 514 of the emitted light 108 passes through the substrate 202 and onto the phosphor 502.

Figure 6:
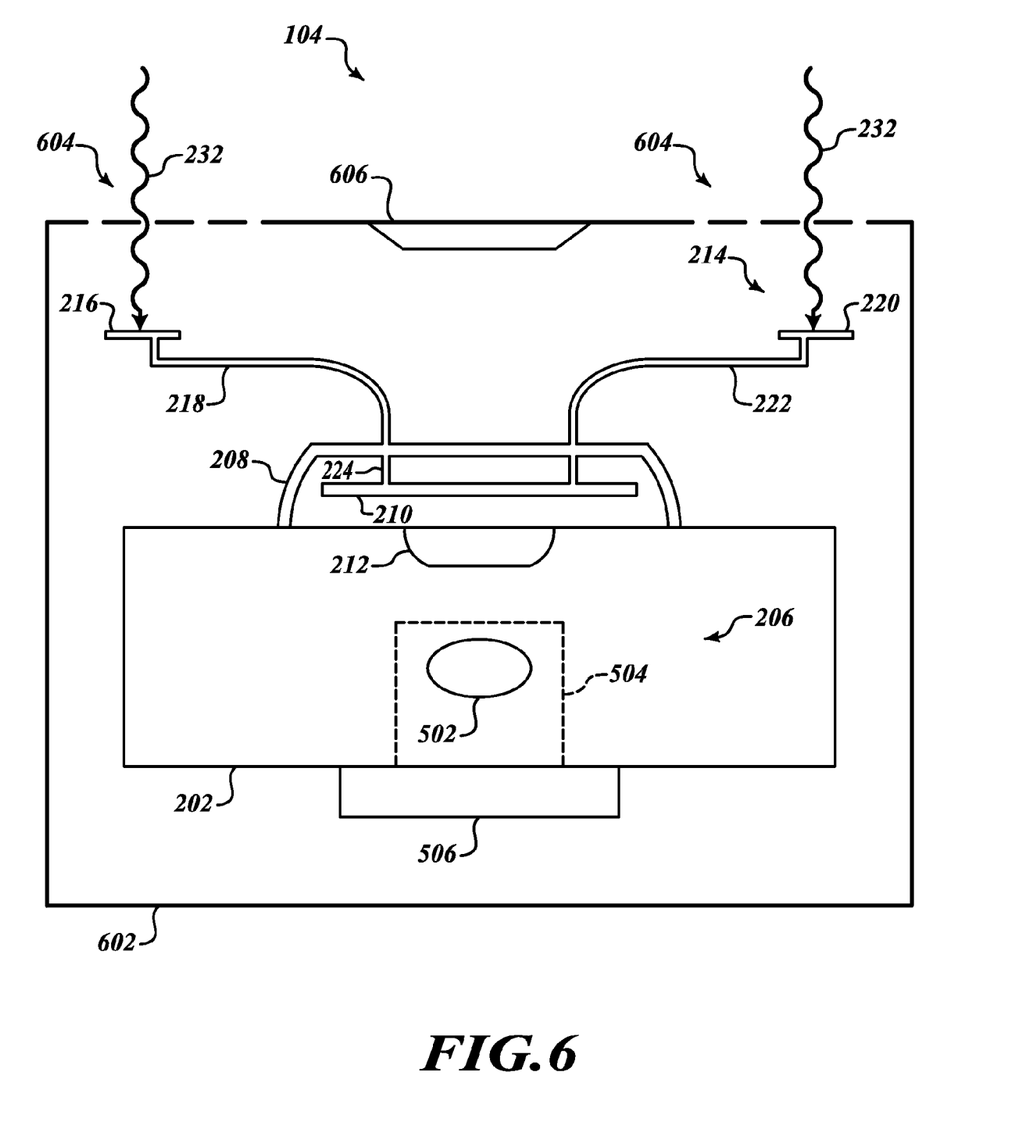
FIG. 6 is a block diagram of an embodiment of the optical-based acoustic sensor integrated into an enclosure.

FIG. 6 is a block diagram of an embodiment of the optical-based acoustic sensor 104 integrated into an enclosure 602. The microphone 214 includes the microphone diaphragm 216 coupled to the lever 218, and/or the microphone diaphragm 220 coupled to the lever 222. The enclosure 602 includes one or more sound-porous regions 604 above the microphone diaphragms 216, 220 to allow passage of the acoustic waves 232 onto the microphone diaphragms 216, 220. The enclosure 602 includes a transparent portion 606. The transparent portion 606 may be a light transmissive cover, or may be the above-described collimating lens 402 or a surface of the above-described optical fiber 404 (FIG. 4). Accordingly, the components of the optical-based acoustic sensor 104 are enclosed in the protective enclosure 602. The enclosure 602 may protect the components of the optical-based acoustic sensor 104 from inclement ambient conditions, such as water, dust, humidity, wind, or the like.

As noted above, in some situations it may be desirable to monitor sounds proximate to a moving object. Since embodiments of the optical-based acoustic sensor 104 do not require a power source or connectors to transmit detected sounds, the optical-based acoustic sensor 104 may be located on the moving object. The mounting of the optical-based acoustic sensor 104 on an object of interest may be covert.

Further, it may be desirable to detect sounds from a plurality of locations. For example, two or more people may be traveling along a path, such as along a hallway, street, or vessel. A plurality of optical-based acoustic sensors 104 may be mounted along the path of travel. The light source device 102 and the detector 106 may be directed along the path of travel such that nearby optical-based acoustic sensors 104 detect the conversation. The mounting of the plurality of optical-based acoustic sensors 104 along a path of travel may be covert such that the conversation may be covertly monitored from a remote location.

In an embodiment operable to remotely detect sounds, the light source device 102 and the detector 106 may be incorporated into a single device. One embodiment may be configured similar to the sighting scope on a gun such that the light 108, when emitted as a beam, may be directed towards and onto a remotely located optical-based acoustic sensor 104 by a user. By incorporating the light source device 102 and the detector 106 into a single device, the detector 106 would also be oriented the same as the light source device 102. Accordingly, the detector 106 would also be directed towards the optical-based acoustic sensor 104. In some embodiments, the lens 114 (FIG. 1) may be also used to receive the sound-modulated light 110 emitted from the optical-based acoustic sensor 104.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An optical acoustic sensor, comprising:
   a substrate with a surface and an internal region;
   a shell disposed above the substrate surface, the shell operable to receive incident light emitted by a light source;
   a beam disposed below the shell;

a photodiode on the substrate surface below the beam, and in response to receiving a first portion of light, the photodiode is operable to generate a charge that attracts the beam such that a motion is induced in the beam to cause the beam to resonate; and a microphone device coupled to the shell, the microphone device operable to detect acoustic waves, and operable to modulate the vibratory motion of the beam, wherein a second portion of light is modulated by the vibratory motion of the beam to generate sound-modulated light that is emitted from the optical acoustic sensor.

2. The optical acoustic sensor of claim 1, wherein the second portion of light is a portion of the incident light, and wherein the second portion of the light is incident on and reflected from the beam.

3. The optical acoustic sensor of claim 1, wherein the incident light is characterized by at least one first wavelength, and further comprising:
a phosphor in the substrate internal region,
wherein the phosphor is operable to receive a third portion of light,
wherein the phosphor is further operable to emit the second portion of light,
wherein the second portion of light emitted from the phosphor is characterized by at least one second wavelength that is different from the first wavelength of the received light, and
wherein the second portion of light is transmitted through the beam, such that the beam modulates the second portion of light by the vibratory motion received from the microphone device to generate the sound-modulated light.

4. The optical acoustic sensor of claim 3, wherein the first wavelength of the incident light corresponds to a substantially near infrared light wavelength and wherein the second wavelength of the phosphor emitted light corresponds to a substantially red-shifted wavelength of the incident light.

5. The optical acoustic sensor of claim 3, wherein the third portion of light is a portion of the incident light that is transmitted through the shell and the beam.

6. The optical acoustic sensor of claim 1, further comprising:
a lever connected to the microphone device and the shell, wherein an end portion of the lever is affixed to an outer surface of a weakened portion of the shell; and
a support affixed to the beam and affixed to an inner surface of the weakened portion of the shell, wherein the support is substantially below the end portion of the lever.

7. The optical acoustic sensor of claim 6, wherein the weakened portion defines at least one channel.

8. The optical acoustic sensor of claim 7, wherein the channel is elliptical about the end portion of the lever.

9. The optical acoustic sensor of claim 6, wherein the support is a first support, wherein the lever is a first lever, wherein the weakened portion of the shell is a first weakened portion, and further comprising:
a first diaphragm coupled to an opposing end of the lever, the first diaphragm operable to sense acoustic waves and operable to generate the vibratory motion that is communicated to the beam;
a second diaphragm operable to sense the acoustic waves and operable to generate the vibratory motion that is communicated to the beam;
a second lever connected to the second diaphragm and the shell, wherein an end portion of the second lever is affixed to an outer surface of a second weakened portion of the shell; and
a second support affixed to the beam and affixed to an inner surface of the second weakened portion of the shell, wherein the second support is substantially below the end portion of the second lever.

10. The optical acoustic sensor of claim 1, further comprising:
a collimating lens with an external surface and an interior surface, the collimating lens disposed above the shell and operable to collect the incident light over the exterior surface, operable to collimate the collected incident light, and operable to transmit the incident light from the interior surface; and
an optical fiber disposed between the collimating lens and the shell, the optical fiber operable to receive the incident light from the interior surface of the collimating lens and operable to transit the incident light to an outer surface of the shell.

11. The optical acoustic sensor of claim 1, wherein the substrate, the shell, the microphone device, the beam, and the photodiode reside in an enclosure, the enclosure comprising:
a sound-porous region above the microphone device that permits the acoustic waves to pass through the enclosure and be incident on the microphone device; and
a transparent portion above the shell that permits the incident light emitted and the sound-modulated light to pass through the enclosure.

12. A method for emitting acoustically modulated light from an optically powered resonant integrated microstructure (O-RIMS) sensor, comprising:
receiving incident light on an outer surface of a shell of the O-RIMS sensor;
transmitting the received incident light through the shell, through a beam, and onto a photodiode;
in response to transmitting the incident light onto the photodiode, generating a charge in the photodiode that attracts the beam such that a motion is induced in the beam to resonate;
changing tension of the beam in response to detecting acoustic waves;
modulating a resonate frequency of the beam by the vibratory motion; and
generating the acoustically modulated light from the modulated resonate frequency of the beam.

13. The method of claim 12, further comprising:
reflecting a portion of the incident light from the beam such that the vibratory motion of the beam modulates the reflected portion of the incident light to generate the acoustically modulated light.

14. The method of claim 12, wherein the incident light characterized by at least one first wavelength, and further comprising:
communicating a portion of the received incident light to a phosphor embedded in a substrate;
emitting light from the phosphor in response to receiving the portion of the incident light, the phosphor emitted light characterized by at least one second wavelength; and
transmitting the phosphor emitted light through the beam such that the vibratory motion of the beam modulates the phosphor emitted light to generate the acoustically modulated light.

15. An optical-based sensor system, comprising:
a light source operable to emit a beam of light;

an optical sensor, the optical sensor comprising:
   a substrate with a surface and an internal region;
   a shell disposed above the substrate surface, the shell operable to receive incident light emitted by a light source;
   a beam affixed to an inner surface of the shell; and
   a photodiode on the substrate surface below the beam, the photodiode operable to generate a charge that attracts the beam such that a vibratory motion is induced in the beam to cause the beam to resonate;
   a microphone device coupled to the shell, the microphone device operable to detect acoustic waves, and operable to modulate the vibratory motion of the beam,
   wherein a portion of the received light is reflected from the beam, such that the beam modulates the reflected portion of light by the vibratory motion modulated by the microphone device; and
  an optical detector is operable receive the reflected portion of light from the beam, and operable to generate a signal having information corresponding to the received reflected portion of light.

16. The optical-based sensor system of claim 15, wherein the incident light is characterized by at least one first wavelength, and further comprising:
   a phosphor in the substrate internal region and operable to receive another portion of the incident light that is transmitted through the shell and the beam, and the phosphor further operable to emit light characterized by at least one second wavelength that is different from the first wavelength of the incident light, the phosphor emitted light transmitted through the photodiode and the beam, such that the beam modulates the phosphor emitted light by the vibratory motion received from the microphone device to generate sound-modulated light that is communicated through the shell, wherein the optical detector is sensitive to the at least one second wavelength of the sound-modulated light.

17. The optical-based sensor system of claim 16, wherein the optical detector comprises:
   a band pass filter operable to pass light having the second wavelength such that the received sound-modulated light is detected, and further operable to block light having other wavelengths such that a signal to noise ratio of the detected sound-modulated light is increased.

18. The optical-based sensor system of claim 16, wherein the light source comprises:
   a laser operable to generate a focused beam of light having the first wavelength, such that the laser is pointable at the optical sensor from a remote distance.

* * * * *